US008720787B2

(12) United States Patent
Koujima et al.

(10) Patent No.: US 8,720,787 B2
(45) Date of Patent: May 13, 2014

(54) COMPOSITE RF TAG, AND TOOL MOUNTED WITH THE COMPOSITE RF TAG

(75) Inventors: Jun Koujima, Hiroshima-ken (JP); Takanori Doi, Hiroshima-ken (JP); Tetsuya Kimura, Hiroshima-ken (JP); Yoshiro Sato, Tokyo (JP)

(73) Assignee: Toda Kogyo Corporation, Hiroshima-ken (JP)

(*) Notice: Subject to any disclaimer, the term of this patent is extended or adjusted under 35 U.S.C. 154(b) by 0 days.

(21) Appl. No.: 13/260,988

(22) PCT Filed: Mar. 25, 2010

(86) PCT No.: PCT/JP2010/055196
§ 371 (c)(1),
(2), (4) Date: Nov. 21, 2011

(87) PCT Pub. No.: WO2010/113751
PCT Pub. Date: Oct. 7, 2010

(65) Prior Publication Data
US 2012/0091210 A1 Apr. 19, 2012

(30) Foreign Application Priority Data
Mar. 31, 2009 (JP) ................. 2009-088129

(51) Int. Cl.
*G06K 19/06* (2006.01)
(52) U.S. Cl.
USPC ........................................ 235/492

(58) Field of Classification Search
CPC .............. G06K 19/07749; G06K 19/0723; G06K 19/077; G07F 7/1008; G06Q 20/341
USPC ........................................ 235/492
See application file for complete search history.

(56) References Cited

U.S. PATENT DOCUMENTS 7,365,686 B2 * 4/2008 Sakama et al. ......... 343/700 MS
8,072,387 B2 12/2011 Kimura et al.
8,159,405 B2 4/2012 Kimura et al.
8,479,999 B2 * 7/2013 Koujima et al. ............ 235/492

(Continued)

FOREIGN PATENT DOCUMENTS

EP 1 679 727 A1 7/2006
EP 1 944 827 A2 7/2008

(Continued)

OTHER PUBLICATIONS

English version of the International Preliminary Report on Patentability in PCT/JP2010/055196 mailed Nov. 24, 2011.
International Search Report for PCT/JP2010/055196 mailed Jun. 15, 2010.
Extended European Search Report in EP 10 75 8524 dated Feb. 11, 2013.

*Primary Examiner* — Seung Lee
(74) *Attorney, Agent, or Firm* — Nixon & Vanderhye P.C.

(57) ABSTRACT

The present invention relates to a composite RF tag for transmitting and receiving information using an electromagnetic induction method, comprising a magnetic antenna mounted with an IC, and a resin layer formed around the magnetic antenna, wherein the magnetic antenna comprises a central core formed of a magnetic material and a coil-shaped electrode material disposed around the core. The RF tag according to the present invention comprises the magnetic antenna surrounded by the resin, and therefore can provide a composite magnetic RF tag which can minimize adverse influence by surrounding water or metals in view of maintenance of tools or parts to which the composite RF tag is mounted, and is free from occurrence of any failure or cracking.

11 Claims, 10 Drawing Sheets

(56) References Cited

U.S. PATENT DOCUMENTS

2003/0231020 A1 12/2003 Yonezawa et al.
2006/0267843 A1 11/2006 Sakama et al.
2007/0023517 A1 2/2007 Tan et al.
2007/0040643 A1 2/2007 Inoue et al.
2008/0024278 A1 1/2008 Volpi et al.

FOREIGN PATENT DOCUMENTS

| JP | 2006-333403 | 12/2006 |
| JP | 2007-041666 | 2/2007 |
| JP | 2007-133651 | 5/2007 |
| WO | WO 2007007639 A1 * | 1/2007 |

* cited by examiner

COMPOSITE RF TAG, AND TOOL MOUNTED WITH THE COMPOSITE RF TAG

This application is the U.S. national phase of International Application No. PCT/JP2010/55196 filed 25 Mar. 2010 which designated the U.S. and claims priority to JP 2009-088129 filed 31 Mar. 2009, the entire contents of each of which are hereby incorporated by reference.

TECHNICAL FIELD

The present invention relates to a composite RF tag for information communication using a magnetic field component. The composite RF tag of the present invention comprises a magnetic antenna mounted with an IC and a resin disposed around the magnetic antenna, whereby adverse influence of not only surrounding water but also surrounding metals on communication characteristics thereof can be minimized. In addition, there can be provided a composite magnetic RF tag which is free from fracture and cracking.

BACKGROUND ART

An antenna for transmitting and receiving an electromagnetic wave using a magnetic material (hereinafter referred to merely as a "magnetic antenna") in which a magnetic field component coming from outside is allowed to pass through a core (magnetic material), around which a coil of a conductive wire is wound, to convert the magnetic field component into a voltage (or current) induced by the coil, has been widely used in small sized radios and TVs. Such a magnetic antenna is also used in a non-contact object identification device called an RF tag which has recently widely come into use.

To transmit and receive an electromagnetic wave with a higher frequency, a planar loop coil which is free of a magnetic material and has a coil surface parallel to an object to be identified is used as an antenna in RF tags. When the frequency is much higher (UHF band or microwave band), an electric field antenna (dipole antenna or dielectric antenna) for detecting an electric field component instead of a magnetic field component is widely used in such RF tags.

However, the planar loop antenna and electric field antenna have the following problems. That is, when such an antenna comes close to a metallic object, an image (mirror effect) is generated on the metallic object. Since the image has a phase opposite to that of the antenna, the sensitivity of the antenna tends to be lost.

On the other hand, there is also known a magnetic antenna for transmitting and receiving a magnetic field component which comprises a magnetic layer as a central core, an coil-shaped electrode material wound on the core, an insulating layer formed on one or both outside surfaces of the core on which the coil-shaped electrode material is provided, and a conductive layer formed on one or both outside surfaces of the insulating layer (Patent Document 1). The magnetic antenna described in Patent Document 1 can maintain properties required for antennas even when coming into contact with metal articles. There are also known tags or magnetic antennas which are installed under specific conditions (Patent Document 2).

Further, it is conventionally known that, in RF tags for transmitting and receiving information using an electromagnetic induction method, surrounding water, if any, has adverse influence thereon, i.e., causes increase in dielectric constant around the RF tags, resulting in deviation of resonance frequency of the RF tags and therefore deterioration in communication characteristics thereof.

PRIOR ARTS

Patent Documents

Patent Document 1: Japanese Patent Application Laid-open (KOKAI) No. 2007-19891
Patent Document 2: Japanese Patent Application Laid-open (KOKAI) No. 2002-207980

SUMMARY OF THE INVENTION

Problem to be Solved by the Invention

In the methods described in Patent Documents 1 and 2, there have been proposed some measures which are taken against the applications in which the magnetic antenna and RF tag are attached to metals in the specific directions. However, in these methods, no sufficient measures against adverse influence of water are taken into consideration. Further, in these methods, no sufficient measures are taken against occurrence of fracture and cracking when the magnetic antenna and RF tag are attached to metallic or plastic parts.

Also, in the case of RF tags of an inlay (inlet) type which have been in general widely spread, a base film used therein tends to hardly withstand a high temperature such as about 100° C. or higher when subjected to injection molding process, etc. The other processes than the above injection molding process such as hot melt process, heat-curing process and UV curing process may also be used for producing the above RF tags. However, these processes tend to be unsuitable for production of the RF tags of an inlay (inlet) type because they have a risk of increase in temperature used therein.

Under these circumstances, an object of the present invention is to provide a composite RF tag comprising a magnetic antenna or a composite magnetic antenna which can be minimized in deterioration of communication characteristics and is free from occurrence of fracture and cracking even when attached to metallic or plastic parts or tools or when used in environmental conditions in which a large amount of surrounding water is present.

Means for Solving the Problem

The above object or technical task of the present invention can be achieved by the following aspects of the present invention.

That is, in accordance with the present invention, there is provided a composite RF tag for transmitting and receiving information using an electromagnetic induction method, comprising a magnetic antenna mounted with an IC, and a resin, wherein the resin is disposed to surround the magnetic antenna and has a thickness of not less than 200 μm (Invention 1).

Also, according to the present invention, there is provided a composite RF tag for transmitting and receiving information using an electromagnetic induction method, comprising a magnetic antenna mounted with an IC, and a resin, wherein the magnetic antenna has a hexahedral shape and comprises a central core formed of a magnetic material and a coil-shaped electrode material disposed around the core, and the resin is disposed to surround the magnetic antenna and has a thickness of not less than 200 μm (Invention 2).

Also, according to the present invention, there is provided the composite RF tag as described in the above Invention 1 or 2, wherein the resin is a polyamide resin, an epoxy resin, a polyimide resin, a urethane rein, a polyolefin resin, an acrylic resin or a mixture of any two or more of these resins (Invention 3).

In addition, according to the present invention, there is provided a tool comprising the composite RF tag as described in any one of the above Inventions 1 to 3 (Invention 4).

Effect of the Invention

The composite RF tag according to the present invention is free from not only deterioration in communication characteristics thereof but also a risk of occurrence of fracture or cracking even when attached to metallic or plastic parts or even when used under environmental conditions in which a large amount of surrounding water is present, and therefore can be suitably used in the applications such as 13.56 MHz RFID.

The composite RF tag according to the present invention has a small size and a high toughness, and is less influenced by outside environments, in particular, metals, conductive materials or water which are present outside of the composite RF tag, and therefore can be used in various applications in which the composite RF tag is attached or fitted to a surface or recess of portable equipments, containers, metallic parts, substrates (boards), metallic tools, various metal molds, printing plates, printing rolls, vehicles such as bicycles and automobiles, metallic jigs, markers for bolts or rivets, etc., or can be used in environmental conditions where a large amount of surrounding water is present, or in water.

EXPLANATION OF REFERENCE NUMERALS

1: Through-hole; 2: electrode layer (coil electrode); 3: core; 4: coil; 4-1: minimum unit of coil; 4-2: coil open end; 5: magnetic layer; 6: insulating layer; 7: conductive layer; 8: non-magnetic layer; 9: IC chip connecting terminal; 10: IC chip; 11: capacitor connecting electrode; 12: capacitor; 17: magnetic antenna; 20: resin

PREFERRED EMBODIMENT FOR CARRYING OUT THE INVENTION

First, the composite RF tag according to the present invention is described.

In the composite RF tag according to the present invention, a resin layer is formed around the magnetic antenna mounted with an IC (RF tag) along a longitudinal direction of a coil thereof (opened end of magnetic flux). The magnetic antenna comprises a central core formed from a magnetic material or from a magnetic material and a non-magnetic material, and a coil-shaped electrode material disposed around the core. The IC is mounted to the magnetic antenna to form an RF tag.

Figure 1:
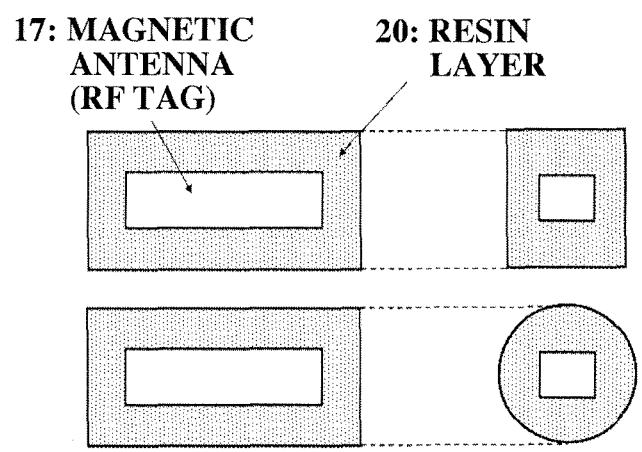
FIG. 1 is a conceptual view showing a composite RF tag according to the present invention.

The composite RF tag according to the present invention is schematically shown in FIG. 1.

As shown in FIG. 1, the composite RF tag according to the present invention has such a structure in which a resin (20) is disposed so as to surround a peripheral portion of the magnetic antenna (17). However, the shape of the composite RF tag according to the present invention is not particularly limited to a rectangular parallelopiped shape or a cylindrical shape as shown in FIG. 1, and the composite RF tag may also have an optional shape such as a polygonal prism shape, a polygonal pyramid shape, a conical shape and a spherical shape. The term "(the resin) surrounding (the magnetic antenna)" as used herein is intended to include all of structures in which a resin is present around the magnetic antenna, for example, the structure in which the magnetic antenna is embedded in a molded product of the resin, the structure in which the magnetic antenna is coated with the resin in the form of a coating film, etc.

In the present invention, the thickness of the resin surrounding the magnetic antenna is not less than 200 μm even at a thinnest portion thereof. When the thickness of the resin is less than 200 μm, the resulting composite RF tag tends to be deteriorated in communication sensitivity by adverse influence of water when attached with water or used in water. The thickness of the resin in the composite RF tag is preferably not less than 250 μm.

The resin layer used in the present invention may be formed of various resins. Examples of the resins include polystyrene resins, acrylonitrile styrene resins, acrylonitrile butadiene styrene resins, acrylic resins, polyethylene resins, polypropylene resins, polyamide resins, polyimide resins, polyacetal resins, polycarbonate resins, vinyl chloride resins, modified polyphenylene ether resins, polybutylene terephthalate resins, polyphenylene sulfide resins, epoxy resins, urethane resins, polyolefin resins, silicone resins, and mixtures of these resins.

Next, the magnetic antenna used in the present invention is described. The shape of the magnetic antenna used in the present invention is not particularly limited, and may be a hexahedral shape such as a cubic shape and a rectangular parallelopiped shape, a polygonal prism shape, a cylindrical shape or a generally U-shape. Among these shapes, preferred is a hexahedral shape such as a cubic shape and a rectangular parallelopiped shape.

Figure 2:
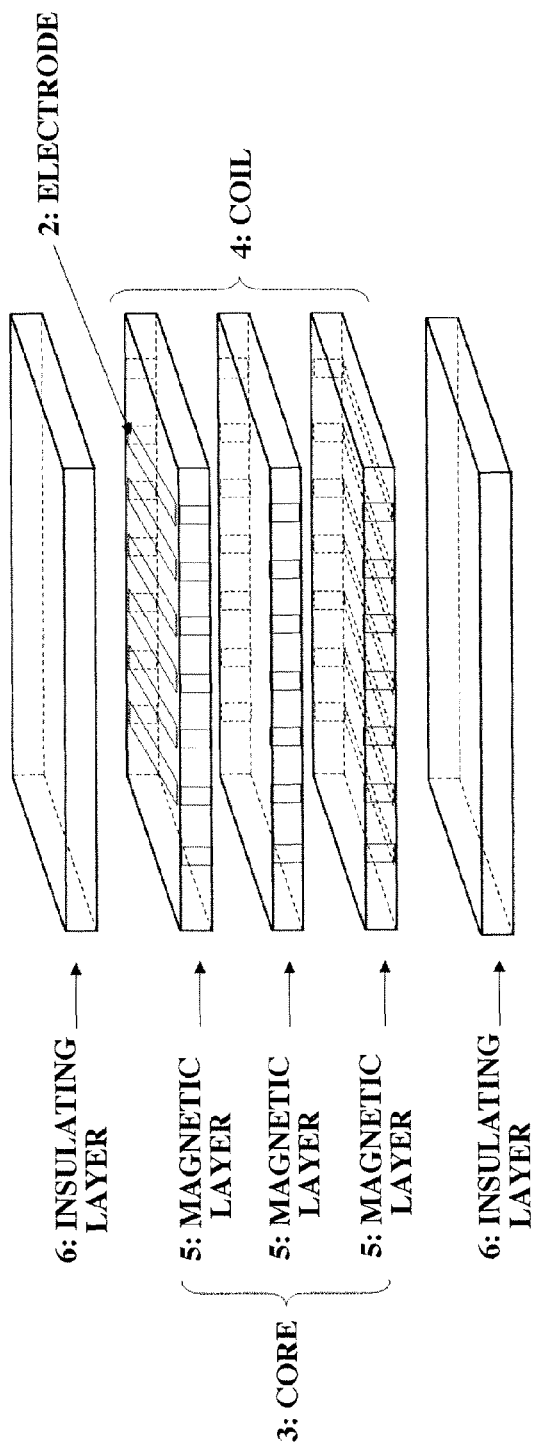
FIG. 2 is a conceptual view showing a magnetic antenna used in the present invention.
Figure 3:
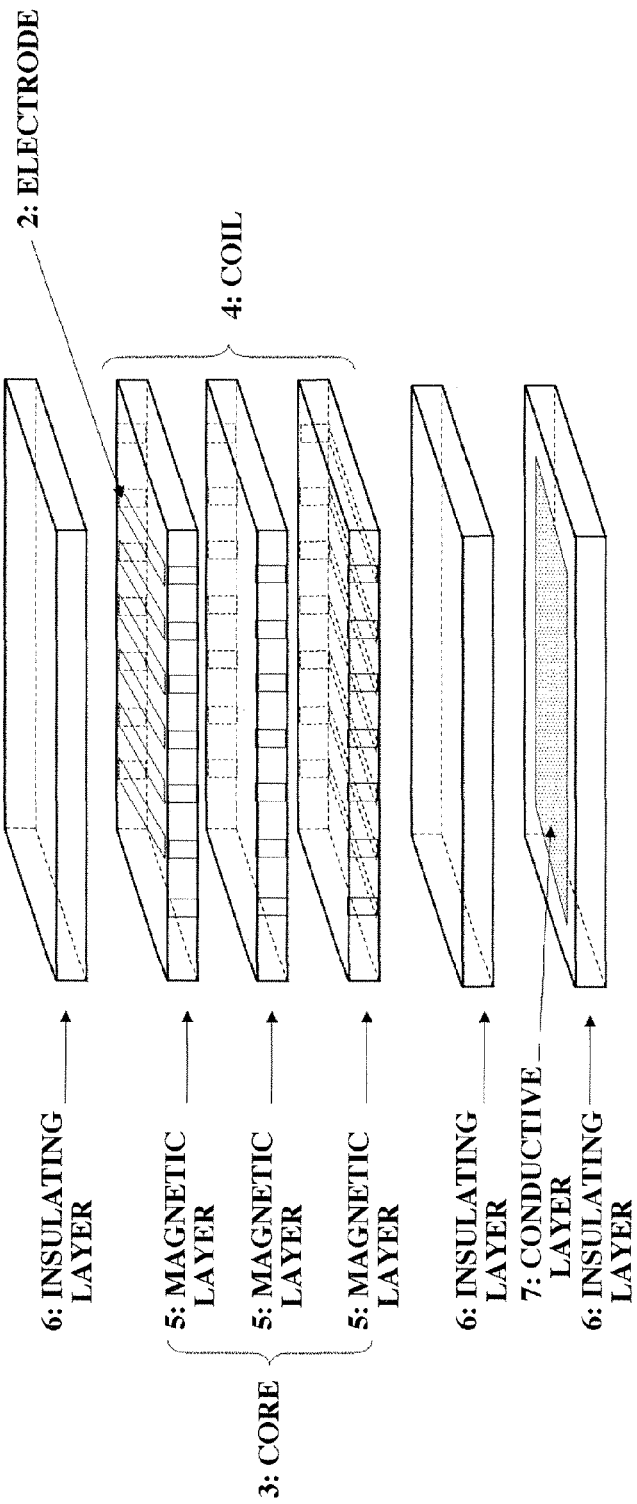
FIG. 3 is a conceptual view showing a magnetic antenna used in the present invention.
Figure 4:
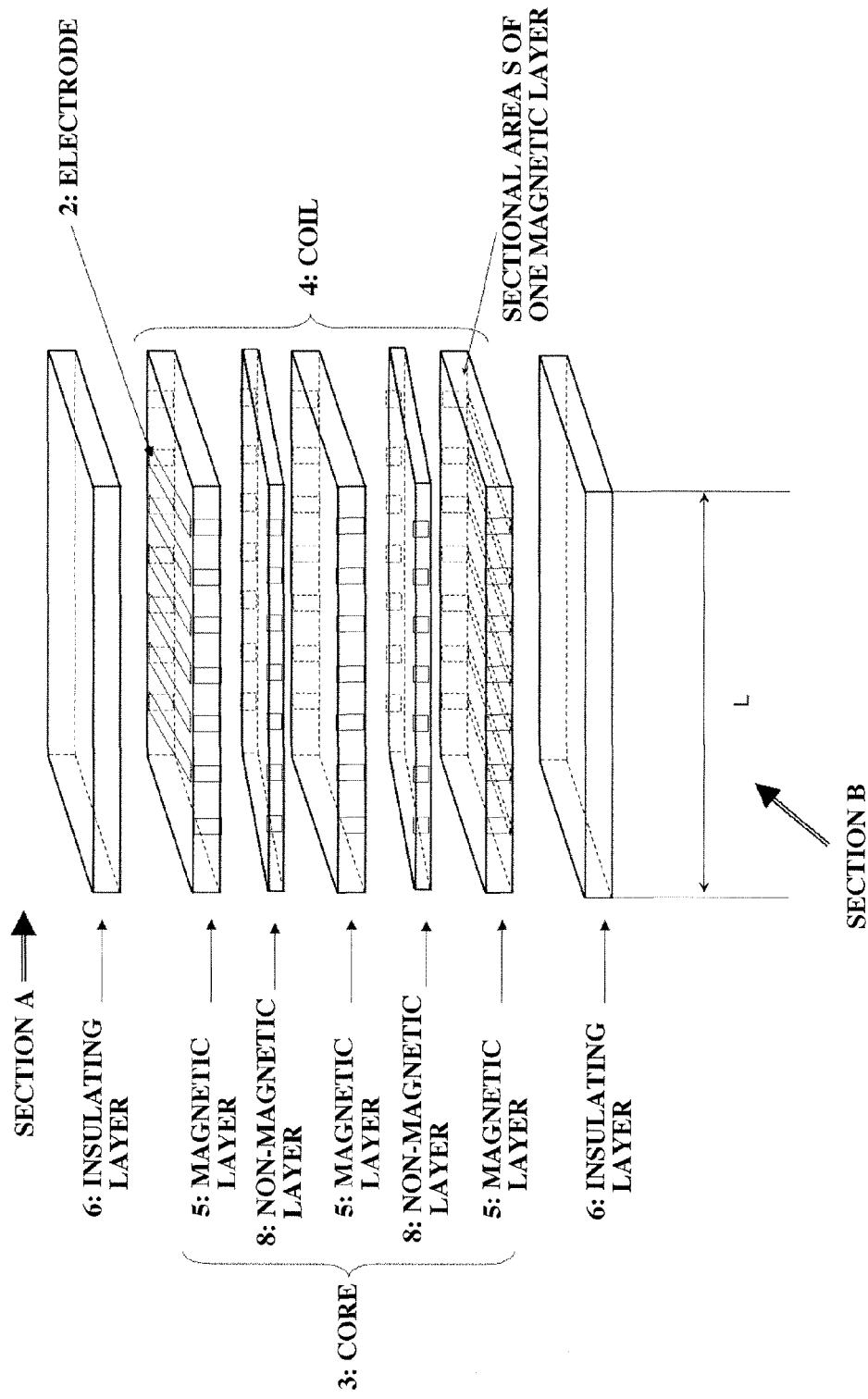
FIG. 4 is a conceptual view showing a magnetic antenna used in the present invention.

In FIGS. 2 to 4, there are shown schematic views of the magnetic antenna used in the present invention.

The magnetic antenna used in the present invention as shown in FIG. 2 has a basic structure which comprises a magnetic layer (core) as a central body, a coil-shaped (wire winding-shaped) electrode material disposed around the central core, and an insulating layer formed on one or both outside surfaces of the core on which the coil-shaped electrode material is provided.

Figure 5:
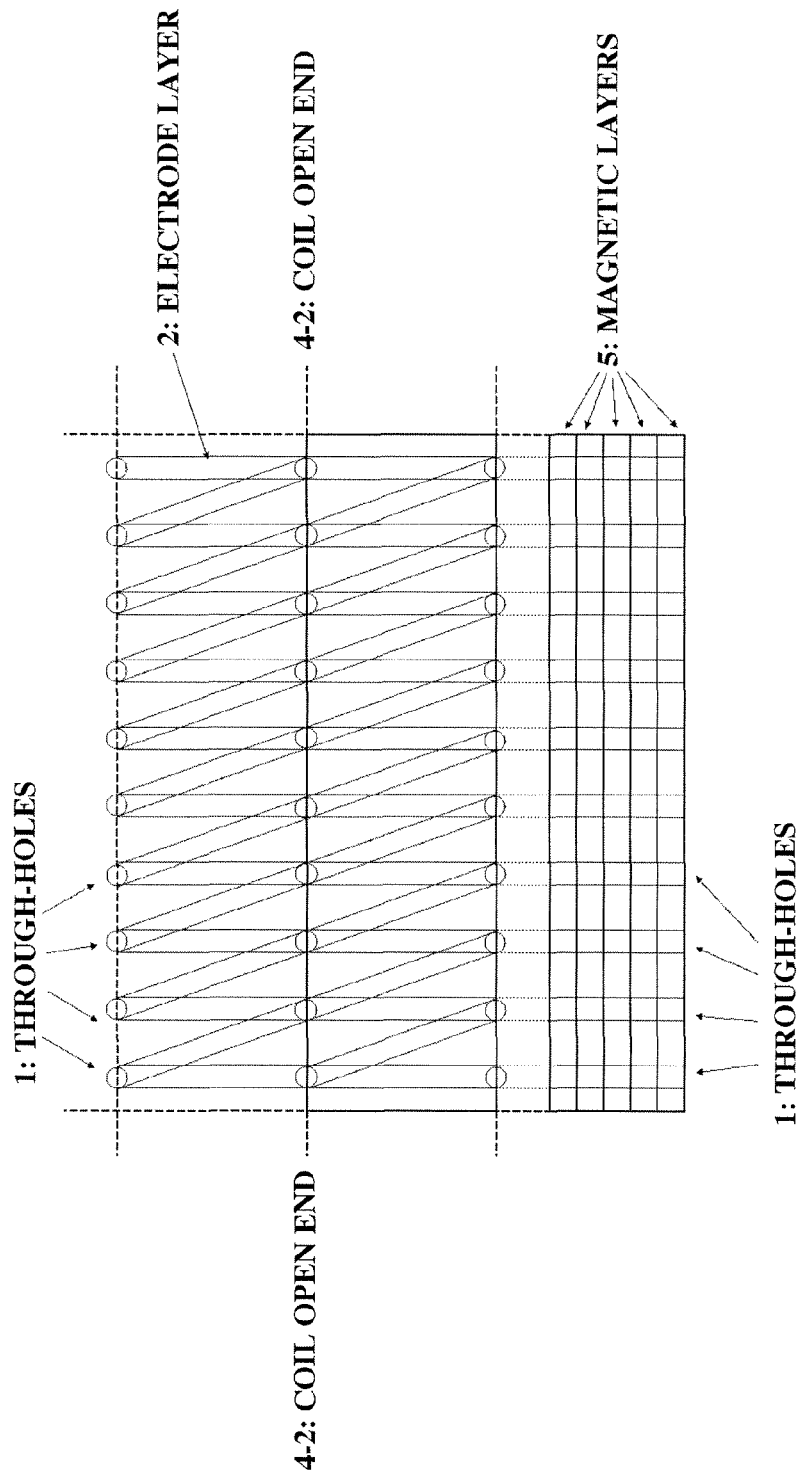
FIG. 5 is a view showing a laminated structure of a coil portion of a magnetic antenna used in the present invention.

In the present invention, the magnetic antenna as shown in FIG. 2 comprises a magnetic layer (5) in the form of a single layer or a laminated layer comprising a plurality of magnetic layers which may be respectively obtained by forming a mixture of magnetic particles and a binder into a sheet shape as shown in FIG. 5. Then, a desired number of through-holes (1) are formed through the thus formed magnetic layer (5). Next, the electrode material is poured into the respective through-holes, and further an electrode layer (2) formed of the electrode material is formed on both surfaces of the magnetic layer which surfaces are perpendicular to the through-holes, to thereby form a coil such that the magnetic layer (5) constitutes a core having a prism shape or a rectangular shape. In this case, there is obtained such a construction in which both terminal ends of the magnetic layer (5) constituting the coil (4) are open ends of a magnetic circuit.

Next, insulating layers (6) are respectively formed on upper and lower surfaces of the coil (4) on which the electrode layer is formed.

The thus obtained sheet is cut into a desired shape along the through-holes (1) and the open ends (3) of the coil and then integrally calcined, or is integrally calcined and then cut into a desired shape along the through-holes (1) and the open ends (3) of the coil, thereby producing the magnetic antenna (LTCC technology).

The magnetic antenna used in the present invention as shown in FIG. 3 has a basic structure which comprises a magnetic layer (core) as a central body, a coil-shaped (wire winding-shaped) electrode material disposed around the central core, an insulating layer formed on one or both outside surfaces of the core on which the coil-shaped electrode material is provided, and a conductive layer formed on one or both outside surfaces of the insulating layer.

Figure 6:
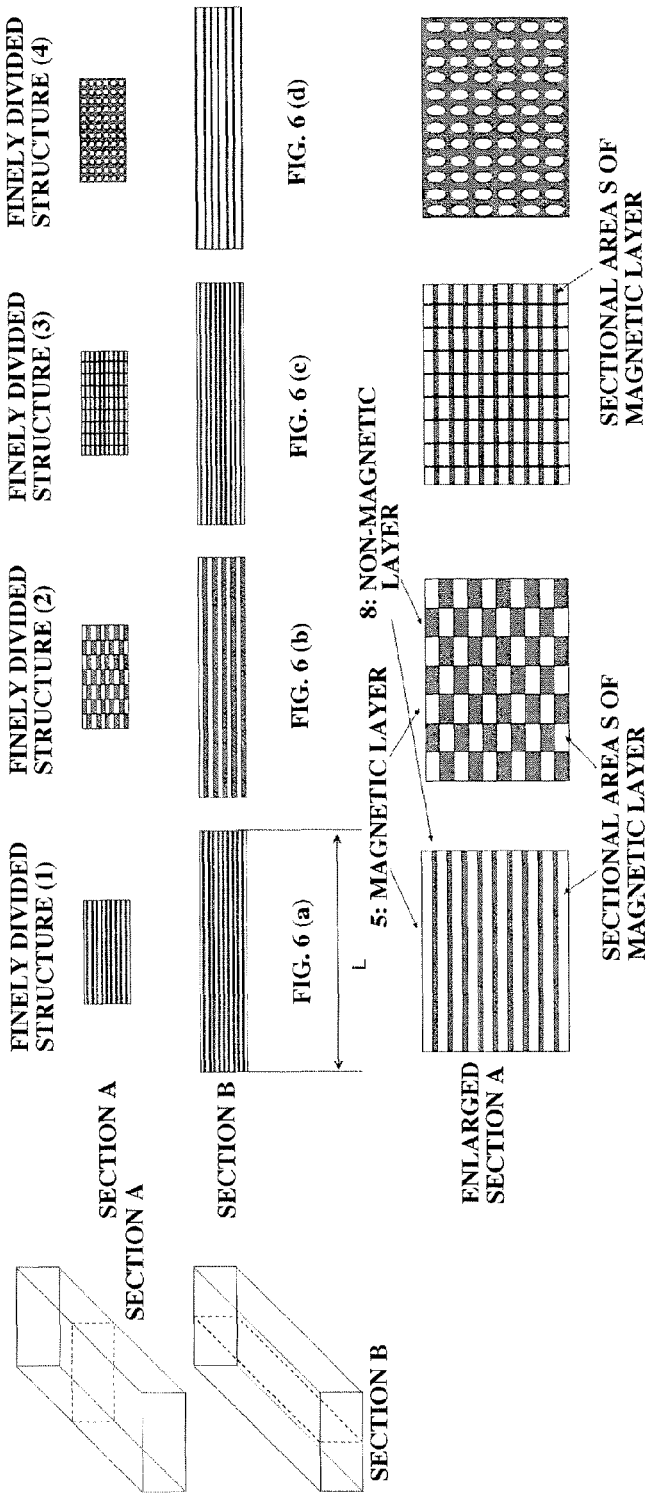
FIG. 6 is a conceptual view showing a magnetic antenna used in the present invention.

The core may have a structure in which a magnetic material constituting the core is divided into plural parts by a non-magnetic material as shown in FIG. 4 or FIG. 6.

In the magnetic antenna used in the present invention, the structure in which the magnetic core is divided into plural parts by the non-magnetic material may be of any configuration as long as the magnetic material is divided by the non-magnetic material when viewed in a section of the core which is cut in the direction perpendicular to a magnetic flux passing through the magnetic antenna. For example, there may be illustrated the structures as shown in FIG. 6(*a*) to FIG. 6(*d*).

The magnetic antenna used in the present invention as shown in FIG. 4 has a basic structure which comprises a central core comprising the magnetic material (5) and the non-magnetic material (8), a coil-shaped (wire winding-shaped) electrode material disposed on an outside of the central core, and an insulating layer formed on one or both outside surfaces of the core on which the coil-shaped electrode material is provided. The core has such a structure in which the magnetic material is divided into plural parts by the non-magnetic material.

Meanwhile, in the magnetic antenna shown in FIG. 4, the area ratio of all portions of the magnetic material to all portions of the non-magnetic material (all portions of the magnetic material/all portions of the non-magnetic material) as measured on the section of the core is preferably not more than 1.0. When the area ratio of the portions formed of the non-magnetic material exceeds the above-specified range, the content of the magnetic material in the core is reduced, which tends to be disadvantageous for achieving reduction in size of the magnetic antenna. The area ratio of all portions of the magnetic material to all portions of the non-magnetic material as measured in the section of the core is more preferably not more than 0.5, and still more preferably not more than 0.2.

Meanwhile, in the magnetic antenna shown in FIG. 4, the ratio of a sectional area (S) of one of the magnetic layers forming the core of the magnetic antenna to a length (L) of the magnetic antenna (S/L) as shown in FIG. 6 is preferably not more than 0.3. When the area ratio (S/L) is more than 0.3, it may be difficult to reduce adverse influences owing to a demagnetizing field.

In the present invention, the magnetic antenna having the core as shown in FIG. 4 may be produced, for example, by the following method.

First, a mixture prepared by mixing magnetic particles and a binder is formed into a sheet shape to form a single magnetic layer or a plurality of magnetic layers in the form of a laminated layer.

Separately, a mixture prepared by mixing non-magnetic particles and a binder is formed into a sheet shape to form a single non-magnetic layer or a plurality of non-magnetic layers in the form of a laminated layer.

Next, as shown in FIG. 6, the magnetic layers (5) and the non-magnetic layers (8) are alternately laminated to obtain a laminate having a desired total thickness.

Then, a desired number of through-holes (1) are formed through the thus obtained laminated layer comprising the magnetic layers and the non-magnetic layers. The electrode material is poured into the respective through-holes. Also, the electrode material is applied on both surfaces of the laminated layer which are perpendicular to the through-holes, to form an electrode layer (2) in the form of a coil (wire winding) which is connected with the electrode material poured into the through-holes. The electrode material poured into the through-holes and the electrode layer cooperate so as to form a coil such as a rectangular core is constituted from the magnetic layers. In this case, there is obtained such a construction in which both terminal ends of the magnetic layers constituting the core are open ends of a magnetic circuit.

Next, as shown in FIG. 4, insulating layers (6) are respectively formed on upper and lower surfaces of the coil on which the electrode layer is provided.

The thus obtained sheet is cut into a desired shape along the through-holes and the open ends of the coil and then integrally calcined, or is integrally calcined and then cut into a desired shape along the through-holes and the open ends of the coil, thereby producing the magnetic antenna (LTCC technology).

Figure 7:
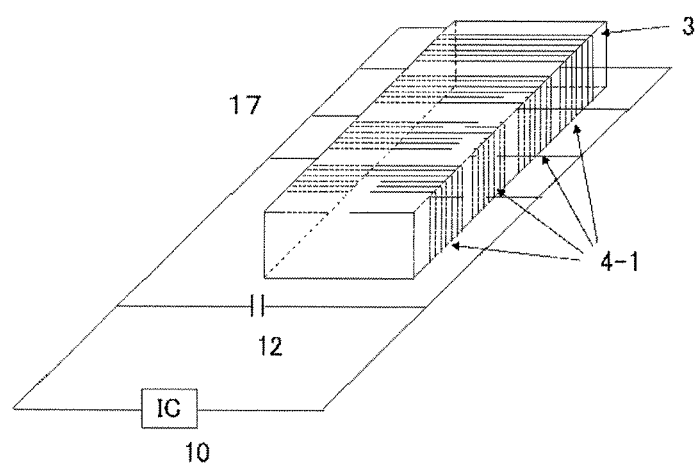
FIG. 7 is a conceptual view showing a magnetic antenna used in the present invention.
Figure 8:
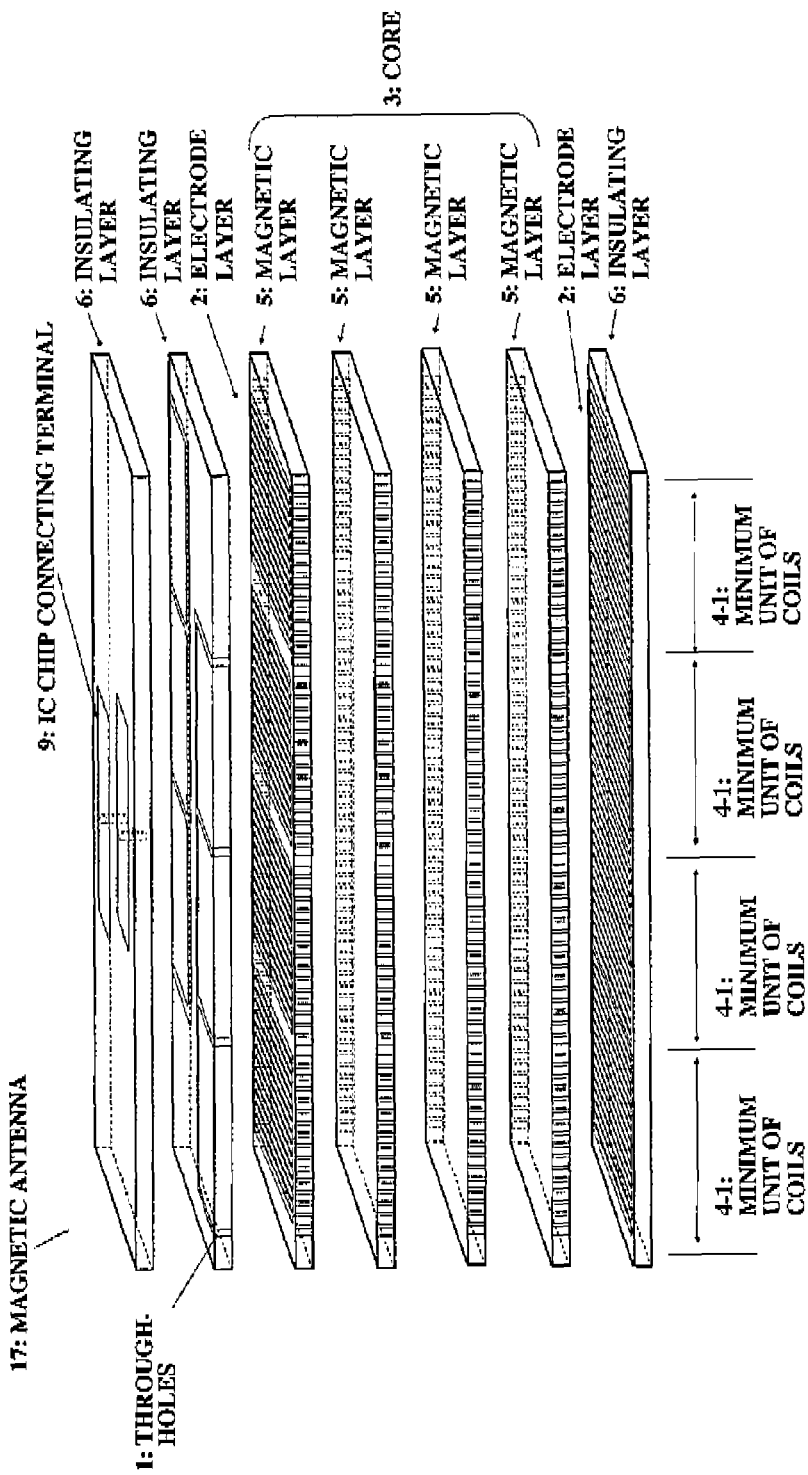
FIG. 8 is a conceptual view showing a magnetic antenna used in the present invention.

As shown in FIG. 7 and FIG. 8, the magnetic antenna (17) used in the present invention may also have a basic structure which comprises a central core (3) formed of a magnetic material and a coil-shaped (wire winding-shaped) electrode material disposed outside of the core (3) to form a plurality of coils (4-1) around the core, wherein a plurality of the coils (4-1) are electrically connected in parallel to each other and disposed in series on the same core (3) (although the number of the coils shown in FIG. 7 and FIG. 8 is four, the number of the coils usable in the present invention is not particularly limited thereto).

The inductance $L_1$ of the respective coils (4-1) of the magnetic antenna having the above structure satisfies the following relational formula (1) when the IC is mounted to the magnetic antenna.

$$L_1 \geq 1/(4\pi^2 \times (\text{operating frequency})^2 \times (\text{capacity of IC} + \text{parasitic capacity of antenna})) \quad \text{<Relational formula (1)>}$$

When the inductance $L_1$ of the respective coils (4-1) of the magnetic antenna is capable of satisfying the above relational formula (1), the resulting magnetic antenna can be further enhanced in communication sensitivity. The inductance $L_1$ of the respective coils (4-1) of the magnetic antenna is preferably not less than 2 times and more preferably not less than 3 times the combined inductance $L_0$ of the magnetic antenna.

The combined inductance $L_0$ of the magnetic antenna having the above structure satisfies the following relational formula (2) when the IC is mounted to the magnetic antenna.

$L_0 \leq 1/(4\pi^2 \times (\text{operating frequency})^2 \times (\text{capacity of IC+parasitic capacity of antenna}))$ <Relational formula (2)>

When the combined inductance $L_0$ of the magnetic antenna is capable of satisfying the above relational formula (2), the resonance frequency of the RF tag to which the IC is mounted can be readily adjusted to its operating frequency, and can be further enhanced in communication sensitivity thereof. The magnetic antenna capable of satisfying the above relational formula (2) may be produced by controlling a magnetic permeability of a material forming the core, the number of winding of the coils, a sectional area of the coils, a length of the coils, etc.

Figure 9:
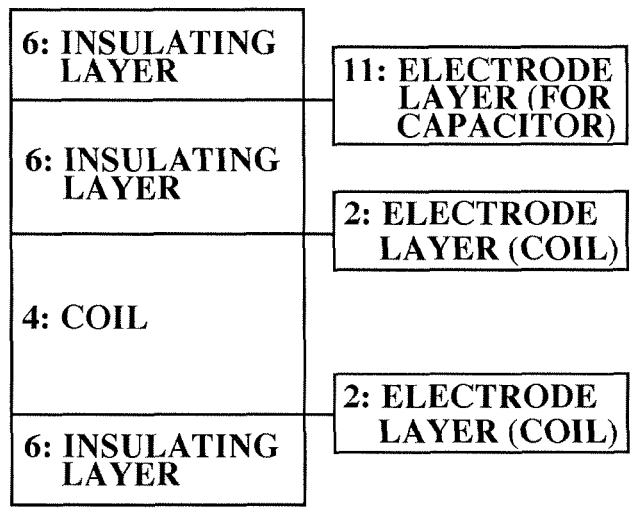
FIG. 9 is a conceptual view showing a laminated structure of a magnetic antenna used in the present invention.

In addition, as schematically shown in FIG. 9, in the magnetic antenna used in the present invention, a capacitor electrode (11) may also be provided on one or both outside surfaces of the insulating layers (6) which are disposed on an upper surface and a lower surface of the coil (4) to sandwich the coil (4) therebetween.

Meanwhile, in the magnetic antenna used in the present invention as schematically shown in FIG. 9, a parallel electrode or an interdigital electrode may also be formed by printing as the capacitor to be formed on an upper surface of the insulating layer. In addition, the capacitor may be connected in parallel or in series to the coil lead terminal.

Figure 10:
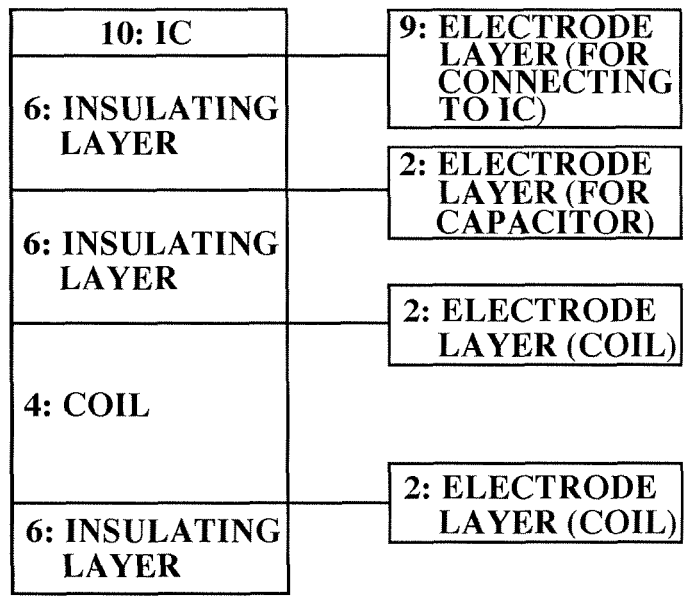
FIG. 10 is a conceptual view showing a laminated structure of a magnetic antenna used in the present invention.
Figure 11:
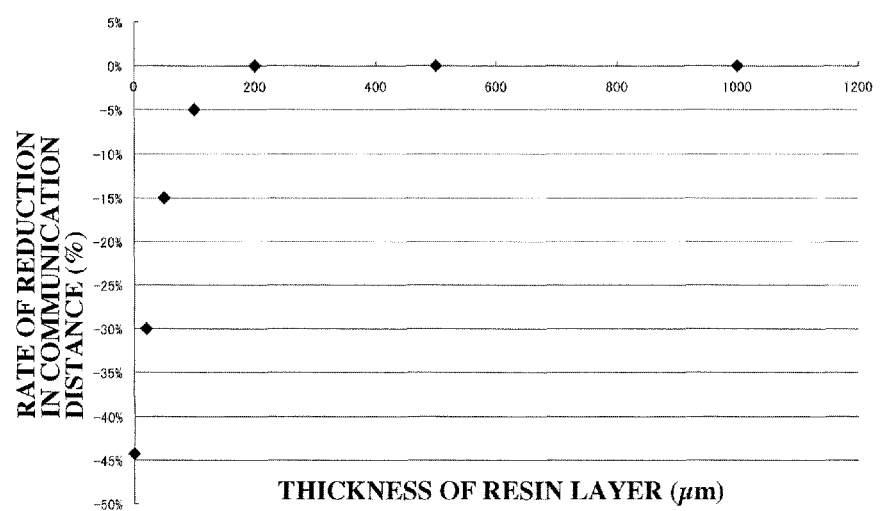
FIG. 11 is a graph showing a relationship between a thickness of a resin in a composite RF tag according to the present invention and a rate of reduction in communication distance thereof.

Further, as schematically shown in FIG. 10, the insulating layer may be further provided on its outside surface where the capacitor electrode (11) is provided, with an additional insulting layer (6). In addition, an electrode layer (9) which also serves as an IC chip connecting terminal may be further formed on an outside surface of the thus formed insulating layer (6) such that the insulating layer (6) is sandwiched therebetween to form a capacitor which may be connected in parallel or in series to the IC chip terminal.

In addition, as shown in FIG. 8, in the magnetic antenna used in the present invention, the terminal (9) capable of being connected with the IC chip (10) may be formed on an upper surface of the insulating layer (6). Meanwhile, the IC chip connecting terminal (9) and the coil lead terminal may be connected in parallel or in series to each other, and then integrally calcined.

In the magnetic antenna used in the present invention, as the magnetic material of the core, there may be used Ni—Zn-based ferrite, etc. The Ni—Zn-based ferrite used in the present invention preferably has a composition comprising 45 to 49.5 mol % of $Fe_2O_3$, 9.0 to 45.0 mol % of NiO, 0.5 to 35.0 mol % of ZnO and 4.5 to 15.0 mol % of CuO. The ferrite composition may be suitably selected such that the resulting core as the magnetic material has a high magnetic permeability and a low magnetic loss in a frequency band to be used. When using a material having a excessively high magnetic permeability as the magnetic material of the core, the resulting core tends to suffer from an increased magnetic loss and as a result, tends to be unsuitable for antennas.

For example, the ferrite composition is preferably selected such that the core has a magnetic permeability of 70 to 120 at 13.56 MHz when the magnetic antenna is applied to an RFID tag, and has a magnetic permeability of 10 to 30 at 100 MHz when the magnetic antenna is used to receive commercial FM broadcasts, because the magnetic loss can be reduced.

In the magnetic antenna used in the present invention, as the non-magnetic material of the core, there may be used non-magnetic ferrites such as Zn-based ferrite, glass-based ceramic materials such as borosilicate glass, zinc glass and lead glass, or mixtures comprising the non-magnetic ferrite and the glass-based ceramic material at an adequate mixing ratio.

The ferrite powder used as the non-magnetic ferrite may be selected so as to have such a Zn-based ferrite composition that a sintered body of the ferrite powder has a volume resistivity of not less than $10^8$ Ω·cm. The Zn-based ferrite composition preferably comprises 45 to 49.5 mol % of $Fe_2O_3$, 17.0 to 22.0 mol % of ZnO and 4.5 to 15.0 mol % of CuO.

The glass-based ceramic powder used as the glass-based ceramic material may be selected so as to have such a composition that its linear expansion coefficient is not largely different from that of the magnetic material used. More specifically, the composition is preferably selected such that the difference in linear expansion coefficient between the glass-based ceramic powder and a soft magnetic ferrite used as the magnetic material lies within the range of ±5 ppm/° C.

Next, the process for producing the composite RF tag according to the present invention is described.

The composite RF tag according to the present invention is formed such that the magnetic antenna mounted with the IC which is produced by the above method is surrounded by the resin.

As the method of forming the resin around the magnetic antenna, there may be used ordinary forming methods such as an injection molding method, a compression molding method, an extrusion molding method, a hot melt method, a UV curing method, a powder coating method and an impasto coating method.

For example, after fitting the RF tag in a metal mold, the molten resin is poured into the metal mold to coat the RF tag therewith, and then solidified, thereby producing the composite RF tag comprising an integrated body comprising the RF tag and the resin.

In addition, the composite RF tag according to the present invention may be used or constructed such that the RF tag is embedded into various resin molded products. For example, the composite RF tag of the present invention may be used in such a configuration as embedded into various containers, packing materials or containers, transporting facilities, boxes, substrates (boards), medical equipments, tools and stationeries.

<Function>

The magnetic antenna according to the present invention can be minimized in deterioration of communication characteristics and is free from fracture or cracking even when placed in such a state as attached to metallic or plastic parts or when used under environmental conditions in which a large amount of surrounding water is present, and therefore can be suitably applied to tools or parts with a good maintenance thereof.

EXAMPLES

In the followings, the present invention is described in more detail on the basis of preferred embodiments thereof by referring to the accompanying drawings. However, these preferred embodiments are only illustrative and not intended to limit the present invention thereto.

RF Tag 1

In order to form a magnetic layer, 100 parts by weight of precalcined Ni—Zn—Cu ferrite particles which had been found to have a magnetic permeability of 100 as a magnetic material at 13.56 MHz after sintering at 900° C. ($Fe_2O_3$: 48.5 mol %; NiO: 25 mol %; ZnO: 16 mol %; CuO: 10.5 mol %), 8 parts by weight of a butyral resin, 5 parts by weight of a plasticizer, and 80 parts by weight of a solvent were mixed in a ball mill to prepare a slurry. The resulting slurry was applied on a PET film by a doctor blade to form a coating layer with a size of 150 mm×150 mm such that the thickness of the coating layer obtained after sintering was 0.1 mm, thereby forming a sheet.

In order to form an insulating layer, 100 parts by weight of precalcined Zn—Cu ferrite particles ($Fe_2O_3$: 48.5 mol %; ZnO: 41 mol %; CuO: 10.5 mol %), 8 parts by weight of a butyral resin, 5 parts by weight of a plasticizer, and 80 parts by weight of a solvent were mixed in a ball mill to prepare a slurry. The resulting slurry was applied on a PET film by a doctor blade to form a coating layer with the same size and thickness as those of the sheet for the magnetic layer, thereby forming a sheet.

Next, as shown in FIG. 5, through-holes (1) were formed through the thus obtained green sheet for the magnetic layer and filled with an Ag paste. In addition, an Ag paste was printed on both surfaces of the green sheet which surfaces are perpendicular to the through-holes (1). Ten sheets of the thus prepared magnetic layers were laminated on one another to form a coil.

Next, as shown in FIG. 2, the green sheets for the insulating layer (6) were respectively laminated on upper and lower surfaces of the coil (4). The thus laminated green sheets were bonded together by applying a pressure thereto. The resulting laminate was cut along the lines passing through the through-holes and the coil open ends (3), and integrally calcined at 900° C. for 2 hr, thereby obtaining a magnetic antenna (1) with a size of 10 mm in width×3 mm in length which had a coil winding number of 23 turns (in these figures, the coil winding number is shown in a simplified manner, and only the three magnetic layers are shown as being laminated for the sake of simplicity. The other drawings are also shown in the same way).

Further, an IC for an RF tag was connected to both ends of the coil of the magnetic antenna, and a capacitor was connected in parallel to the IC. Then, the resonance frequency was adjusted to 13.56 MHz, thereby obtaining an RF tag.

The thus obtained RF tag was loaded in an injection molding machine, and molded together with a polypropylene resin such that the resulting resin coat had a thickness of 1000 μm, thereby obtaining a composite RF tag 1.

[Methods for Measuring and Adjusting Resonance Frequency]

The resonance frequency was determined from a peak frequency of impedance as measured by an impedance analyzer "4291A" manufactured by Agilent Technology Co., Ltd.

[Method for Measuring Communication Distance]

The communication distance was determined from a maximum distance between a reader/writer (product name "TR3-A201/TR3-C201" manufactured by Takaya Co., Ltd.) as an antenna and the above obtained composite RF tag at which they were able to still communicate with each other at 13.56 MHz.

To evaluate the communication distance in water, the composite RF tag was placed in a container filled with water, and the container was allowed to move toward and away from the antenna to vary the distance therebetween and measure the maximum distance therebetween at which the antenna and the composite RF tag were able to still communicate with each other.

RF Tag 2

The magnetic antenna produced in the same manner as defined in RF tag 1 was subjected to a hot melt molding process together with a polyamide-based resin such that the resulting resin coat had a thickness of 500 μm, thereby obtaining a composite RF tag 2.

RF Tag 3

The magnetic antenna produced in the same manner as defined in RF tag 1 was subjected to a UV curing process together with an acrylic UV-curing resin such that the resulting resin coat had a thickness of 200 μm, thereby obtaining a composite RF tag 3.

RF Tag 4

Comparative Example

The magnetic antenna produced in the same manner as defined in RF tag 1 was directly mounted with an IC, and a resonance frequency thereof was adjusted to 13.56 MHz while maintaining the magnetic antenna as such, thereby obtaining an RF tag 4.

RF Tag 5

Comparative Example

The magnetic antenna produced in the same manner as defined in RF tag 1 was coated with an epoxy-based resin such that the resulting resin coat had a thickness of 20 μm, thereby obtaining a composite RF tag 5.

RF Tag 6

Comparative Example

The magnetic antenna produced in the same manner as defined in RF tag 1 was coated with a polyimide-based resin such that the resulting resin coat had a thickness of 50 μm, thereby obtaining a composite RF tag 6.

RF Tag 7

Comparative Example

The magnetic antenna produced in the same manner as defined in RF tag 1 was coated with an epoxy-based resin such that the resulting resin coat had a thickness of 100 μm, thereby obtaining a composite RF tag 7.

TABLE 1

| Examples and Comp. Examples | Thickness of resin coat (μm) | Communication distance (mm) | Resonance frequency (MHz) | Rate of reduction in communication distance in water (%) |
|---|---|---|---|---|
| RF tag 1 | 1000 | 60 | 13.6 | 0% |
| RF tag 2 | 500 | 60 | 13.6 | 0% |
| RF tag 3 | 200 | 60 | 13.6 | 0% |
| RF tag 4 (Comp. Example) | 0 | 60 | 13.6 | −44% |
| RF tag 5 (Comp. Example) | 20 | 60 | 13.6 | −30% |
| RF tag 6 (Comp. Example) | 50 | 60 | 13.6 | −15% |
| RF tag 7 (Comp. Example) | 100 | 60 | 13.6 | −5% |

As shown in Table 1, even when coated with the resin, the obtained composite RF tag could maintain a good performance similar to those of Comparative Examples, and was free from deterioration in communication characteristics even in the state immersed in water, as well as from fracture and cracking.

INDUSTRIAL APPLICABILITY

The composite RF tag according to the present invention has a small size and a high toughness, and is less influenced by outside environments, in particular, metals, conductive materials or water which are present outside of the composite RF tag, and therefore can be used in various applications in which the composite RF tag is attached or fitted to a surface or recess of portable equipments, containers, metallic parts, substrates (boards), metallic tools, various metal molds, printing plates, printing rolls, vehicles such as bicycles and automobiles, metallic jigs, markers for bolts or rivets, etc., or can be used in environmental conditions in which a large amount of surrounding water is present, or in water.

The invention claimed is:

1. A composite RF tag for transmitting and receiving information using an electromagnetic induction method, comprising a magnetic antenna mounted with an IC, and a resin, which resin is disposed to surround the magnetic antenna and has a thickness of not less than 200 μm, which magnetic antenna comprises a magnetic layer as a central body, a coil-shaped electrode material disposed around the central core, an insulating layer formed on one or both outside surfaces of the core on which the coil-shaped electrode material is provided, and a conductive layer formed on one or both outside surfaces of the insulating layer.

2. The composite RF tag according to claim 1, wherein a magnetic material constituting the core is divided into plural parts by a non-magnetic material.

3. The composite RF tag according to claim 1, wherein the resin is a polyamide resin, an epoxy resin, a polyimide resin, a urethane rein, a polyolefin resin, an acrylic resin or a mixture of any two or more of these resins.

4. An article comprising the composite RF tag as defined in claim 1 fitted or attached to a surface or embedded therein.

5. The composite RF tag for transmitting and receiving information using an electromagnetic induction method, comprising a magnetic antenna mounted with an IC, and a resin, which resin is disposed to surround the magnetic antenna and has a thickness of not less than 200 μm, wherein a magnetic material constituting a core divided into plural parts by a non-magnetic material.

6. The composite RF tag according to claim 5, wherein the resin is a polyamide resin, an epoxy resin, a polyimide resin, a urethane rein, a polyolefin resin, an acrylic resin or a mixture of any two or more of these resins.

7. An article comprising the composite RF tag as defined in claim 5 fitted or attached to a surface or embedded therein.

8. A composite RF tag for transmitting and receiving information using an electromagnetic induction method, comprising a magnetic antenna mounted with an IC, and a resin, which resin is disposed to surround the magnetic antenna and has a thickness of not less than 200 μm, which magnetic antenna comprises a central core formed of a magnetic material and a coil-shaped electrode material disposed outside of the core to form a plurality of coils around the core, wherein a plurality of the coils are electrically connected in parallel to each other and disposed in series on the same core.

9. The composite RF tag according to claim 8, wherein a magnetic material constituting the core is divided into plural parts by a non-magnetic material.

10. The composite RF tag according to claim 8, wherein the resin is a polyamide resin, an epoxy resin, a polyimide resin, a urethane rein, a polyolefin resin, an acrylic resin or a mixture of any two or more of these resins.

11. An article comprising the composite RF tag as defined in claim 8 fitted or attached to a surface or embedded therein.

* * * * *